United States Patent
Yuan

(10) Patent No.: US 8,936,261 B2
(45) Date of Patent: Jan. 20, 2015

(54) CHILD CARRIER APPARATUS

(75) Inventor: Jialiang Yuan, Hong Kong (HK)

(73) Assignee: Wonderland Nurserygoods Company Limited, Hong Kong (HK)

(*) Notice: Subject to any disclaimer, the term of this patent is extended or adjusted under 35 U.S.C. 154(b) by 268 days.

(21) Appl. No.: 13/329,656

(22) Filed: Dec. 19, 2011

(65) Prior Publication Data

US 2012/0153583 A1 Jun. 21, 2012

(30) Foreign Application Priority Data

Dec. 20, 2010 (CN) .......................... 2010 1 0613144

(51) Int. Cl.
| | | |
|---|---|---|
| *B62B 7/14* | (2006.01) | |
| *B62B 9/28* | (2006.01) | |
| *B62B 7/00* | (2006.01) | |
| *B62B 7/04* | (2006.01) | |

(52) U.S. Cl.
CPC . *B62B 9/28* (2013.01); *B62B 7/044* (2013.01); *B62B 7/142* (2013.01); *B62B 7/008* (2013.01)
USPC ...................... 280/47.38; 280/647

(58) Field of Classification Search
USPC ........ 280/30, 6.152, 33.993, 33.998, 638, 35, 280/643, 647, 648, 650, 657, 658, 47.18, 280/47.25, 47.38, 47.4, 47.41, 33.992
See application file for complete search history.

(56) References Cited

U.S. PATENT DOCUMENTS

| | | | | |
|---|---|---|---|---|
| 4,872,692 A | * | 10/1989 | Steenburg ...................... 280/30 |
| 5,018,405 A | | 5/1991 | Chiu |
| 5,676,386 A | * | 10/1997 | Huang ............................ 280/30 |
| 5,722,682 A | * | 3/1998 | Wang ............................ 280/642 |
| 5,947,555 A | * | 9/1999 | Welsh et al. .................. 297/130 |
| 6,513,827 B1 | * | 2/2003 | Barenbrug .................... 280/648 |
| 6,530,591 B2 | * | 3/2003 | Huang ........................... 280/650 |
| 6,581,957 B1 | * | 6/2003 | Lan ............................... 280/642 |
| 6,851,700 B2 | * | 2/2005 | Yoshie et al. ................. 280/642 |
| 7,032,922 B1 | * | 4/2006 | Lan ............................... 280/648 |
| 7,267,359 B1 | * | 9/2007 | Yang et al. .................... 280/642 |
| 7,377,537 B2 | * | 5/2008 | Li .................................. 280/650 |
| 7,401,803 B1 | * | 7/2008 | Lai ................................ 280/647 |
| 7,681,894 B2 | * | 3/2010 | Santamaria ................ 280/47.38 |
| 7,686,323 B2 | * | 3/2010 | Chen ............................. 280/642 |
| 7,753,397 B2 | * | 7/2010 | Yang ............................. 280/642 |
| 7,753,398 B2 | * | 7/2010 | Yang ............................. 280/642 |
| 7,789,402 B2 | * | 9/2010 | Saville et al. .............. 280/47.38 |
| 7,798,500 B2 | * | 9/2010 | Den Boer .................... 280/47.34 |
| 7,938,435 B2 | * | 5/2011 | Sousa et al. .................... 280/658 |
| 8,029,014 B2 | * | 10/2011 | Ahnert et al. ................ 280/650 |
| 8,033,555 B2 | * | 10/2011 | Mostert et al. ............. 280/47.38 |

(Continued)

FOREIGN PATENT DOCUMENTS

| | | |
|---|---|---|
| CN | 2918182 Y | 7/2007 |
| CN | 201511991 U | 6/2010 |

(Continued)

*Primary Examiner* — Katy M Ebner
*Assistant Examiner* — Brodie Follman
(74) *Attorney, Agent, or Firm* — David I. Roche; Baker & McKenzie LLP

(57) ABSTRACT

A child carrier apparatus can comprise a base frame having a tube segment that is affixed with an attachment fixture, and a detachable seat including a tubular support, and a coupling element mounted at a side segment of the tubular support. The inclination of the tubular support is adjustable relative to the coupling element, and the coupling element is configured to detachably locked with the attachment fixture via a latch to hold the seat with the base frame.

19 Claims, 14 Drawing Sheets

(56) References Cited

U.S. PATENT DOCUMENTS

| | | | |
|---|---|---|---|
| 8,157,286 B2* | 4/2012 | Lai | 280/647 |
| 8,205,906 B2* | 6/2012 | Kretschmer et al. | 280/642 |
| 8,240,700 B2* | 8/2012 | Greger et al. | 280/648 |
| 8,251,382 B2* | 8/2012 | Chen et al. | 280/47.41 |
| 8,322,744 B2* | 12/2012 | Ahnert et al. | 280/642 |
| 8,366,127 B2* | 2/2013 | Zhong et al. | 280/47.4 |
| 8,454,049 B2* | 6/2013 | Chen et al. | 280/650 |
| 8,465,045 B2* | 6/2013 | Lai | 280/650 |
| 8,469,388 B2* | 6/2013 | Moore | 280/642 |
| 8,474,854 B2* | 7/2013 | Dean et al. | 280/647 |
| 8,480,116 B2* | 7/2013 | Li | 280/643 |
| 8,485,546 B2* | 7/2013 | Li et al. | 280/642 |
| 8,544,873 B2* | 10/2013 | Chen | 280/658 |
| 8,550,489 B2* | 10/2013 | Valdez et al. | 280/647 |
| 8,596,669 B2* | 12/2013 | Liao | 280/647 |
| 2004/0164593 A1 | 8/2004 | Jane Santamaria | 297/130 |
| 2006/0261565 A1* | 11/2006 | Tan | 280/47.38 |
| 2007/0045975 A1* | 3/2007 | Yang | 280/47.38 |
| 2007/0069505 A1 | 3/2007 | Li | |
| 2007/0187914 A1* | 8/2007 | Jane Santamaria | 280/47.38 |
| 2008/0054579 A1* | 3/2008 | Liu | 280/35 |
| 2008/0150247 A1* | 6/2008 | Lake | 280/47.41 |
| 2008/0179848 A1* | 7/2008 | Lake | 280/47.41 |
| 2008/0303232 A1* | 12/2008 | Chen et al. | 280/47.41 |
| 2009/0033066 A1* | 2/2009 | Saville et al. | 280/650 |
| 2009/0102162 A1* | 4/2009 | Chen | 280/642 |
| 2009/0256323 A1* | 10/2009 | Mostert et al. | 280/47.38 |
| 2010/0013281 A1* | 1/2010 | Chen et al. | 297/243 |
| 2010/0102535 A1* | 4/2010 | Zhong | 280/650 |
| 2010/0127480 A1* | 5/2010 | Ahnert et al. | 280/647 |
| 2010/0230933 A1* | 9/2010 | Dean et al. | 280/647 |
| 2010/0244408 A1* | 9/2010 | Dean et al. | 280/647 |
| 2010/0259021 A1* | 10/2010 | Ahnert et al. | 280/47.4 |
| 2011/0204600 A1* | 8/2011 | Lai | 280/647 |
| 2011/0291389 A1* | 12/2011 | Offord | 280/650 |
| 2011/0304124 A1* | 12/2011 | Chen et al. | 280/647 |
| 2012/0025492 A1* | 2/2012 | Grintz et al. | 280/647 |
| 2012/0153583 A1* | 6/2012 | Yuan | 280/30 |
| 2012/0242062 A1* | 9/2012 | Schroeder et al. | 280/650 |
| 2012/0261961 A1* | 10/2012 | Heisey et al. | 297/256.16 |
| 2013/0113188 A1* | 5/2013 | Liao | 280/650 |

FOREIGN PATENT DOCUMENTS

| | | |
|---|---|---|
| EP | 1918155 A2 | 5/2008 |
| GB | 2446957 A | 8/2008 |
| GB | 2445339 B | 4/2009 |
| GB | 2468796 A | 9/2010 |
| WO | 2010040644 A1 | 4/2010 |

* cited by examiner

CHILD CARRIER APPARATUS

CROSS-REFERENCE TO RELATED APPLICATION(S)

This application claims priority of China Patent Application No. 201010613144.6 filed on Dec. 20, 2010.

BACKGROUND OF THE INVENTION

1. Field of the Invention

The present invention relates to child carrier apparatuses, and more particularly to child carrier apparatuses having rear seats.

2. Description of the Related Art

Some current strollers may include front and rear seats to accommodate more than one child at a time. The stroller with front and rear seats differs from conventional strollers with a single front seat by including additional support tubes for affixing the rear seat. Moreover, child strollers with front and rear seats may generally have two types of construction: a first type has the rear seat permanently affixed with the stroller frame, and a second type has the rear seat detachably mounted with the stroller frame so that it can be removed from the child stroller. For detaching the rear seat, the child stroller frame usually includes a resilient element having a side portion provided with a protrusion, and the rear seat may have a seat support tube provided with a hole corresponding to the protrusion. When the rear seat is installed with the stroller frame, the protrusion of the resilient element can engage with the hole to lock the seat support tube with the stroller frame. When the caregiver wants to remove the rear seat, the protrusion can be depressed to disengage from the hole of the seat support tube. Being unlocked, the rear seat then can be detached from the stroller frame.

However, the conventional constructions may not be convenient to operate for removing the rear seat. Moreover, no recline adjustment of the seat is permitted.

Therefore, there is a need for an improved child carrier apparatus having a detachable rear seat that is adjustable in angular position and address at least the foregoing issues.

SUMMARY

The present application describes a child carrier apparatus having a seat that is detachable and adjustable in inclination. In some embodiments, the child carrier apparatus can comprise a base frame having a tube segment that is affixed with an attachment fixture, and a detachable seat including a tubular support structure, and a coupling element mounted at a side segment of the support structure. The inclination of the support structure is adjustable relative to the coupling element, and the coupling element is configured to detachably locked with the attachment fixture via a latch to hold the seat with the base frame.

In other embodiments, the child carrier apparatus can comprise a base frame having a tube segment that is affixed with an attachment fixture, and a detachable seat including a tubular support structure that is configured to fasten with the attachment fixture to hold the seat with the base frame. The attachment fixture and the support are locked with each other via a latch, and the support structure includes a release mechanism that is operable to drive movement of the latch from a locking position to an unlocking position to allow removal of the seat from the base frame.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
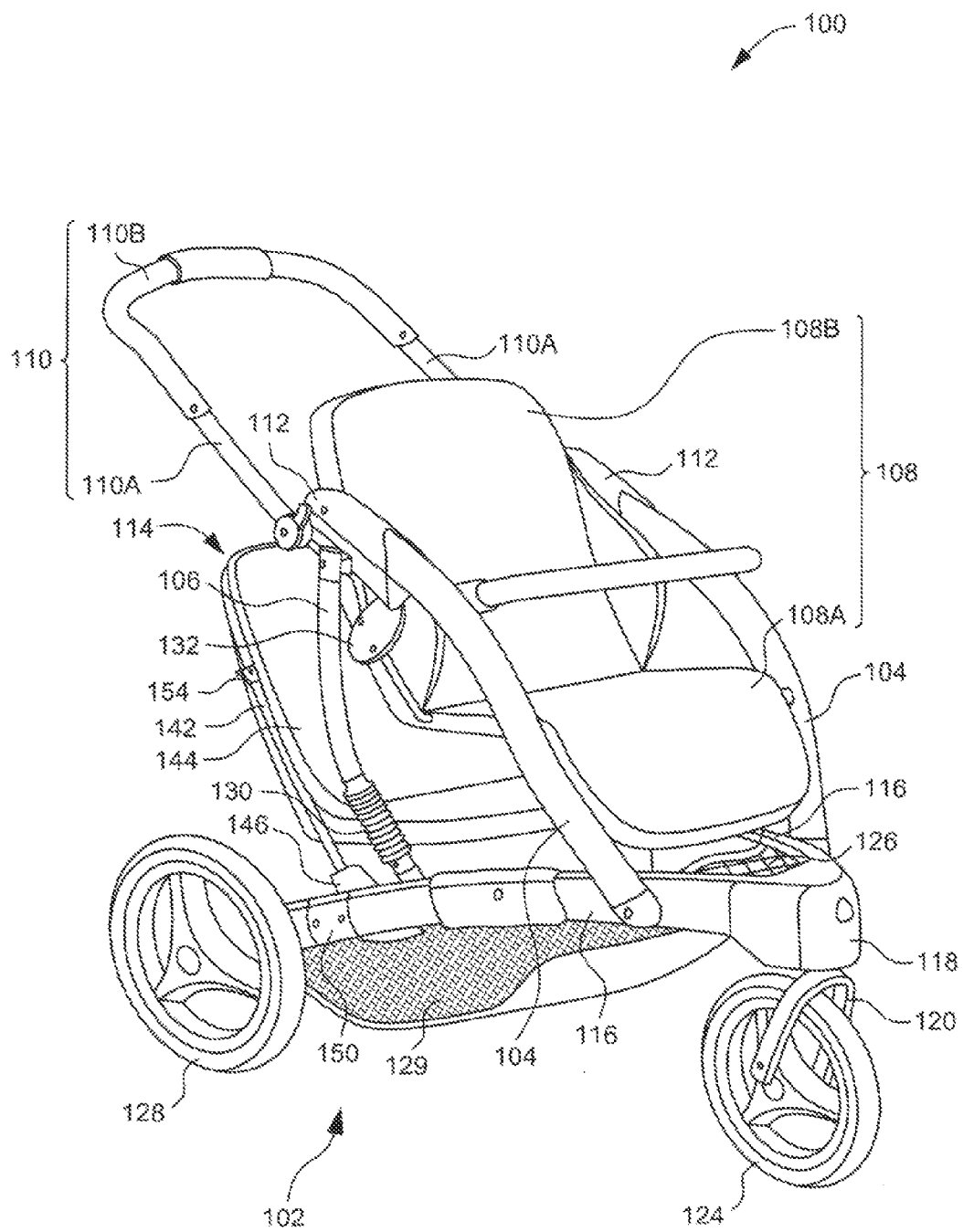
FIG. 1 is a perspective view illustrating an embodiment of a child carrier apparatus.
Figure 2:
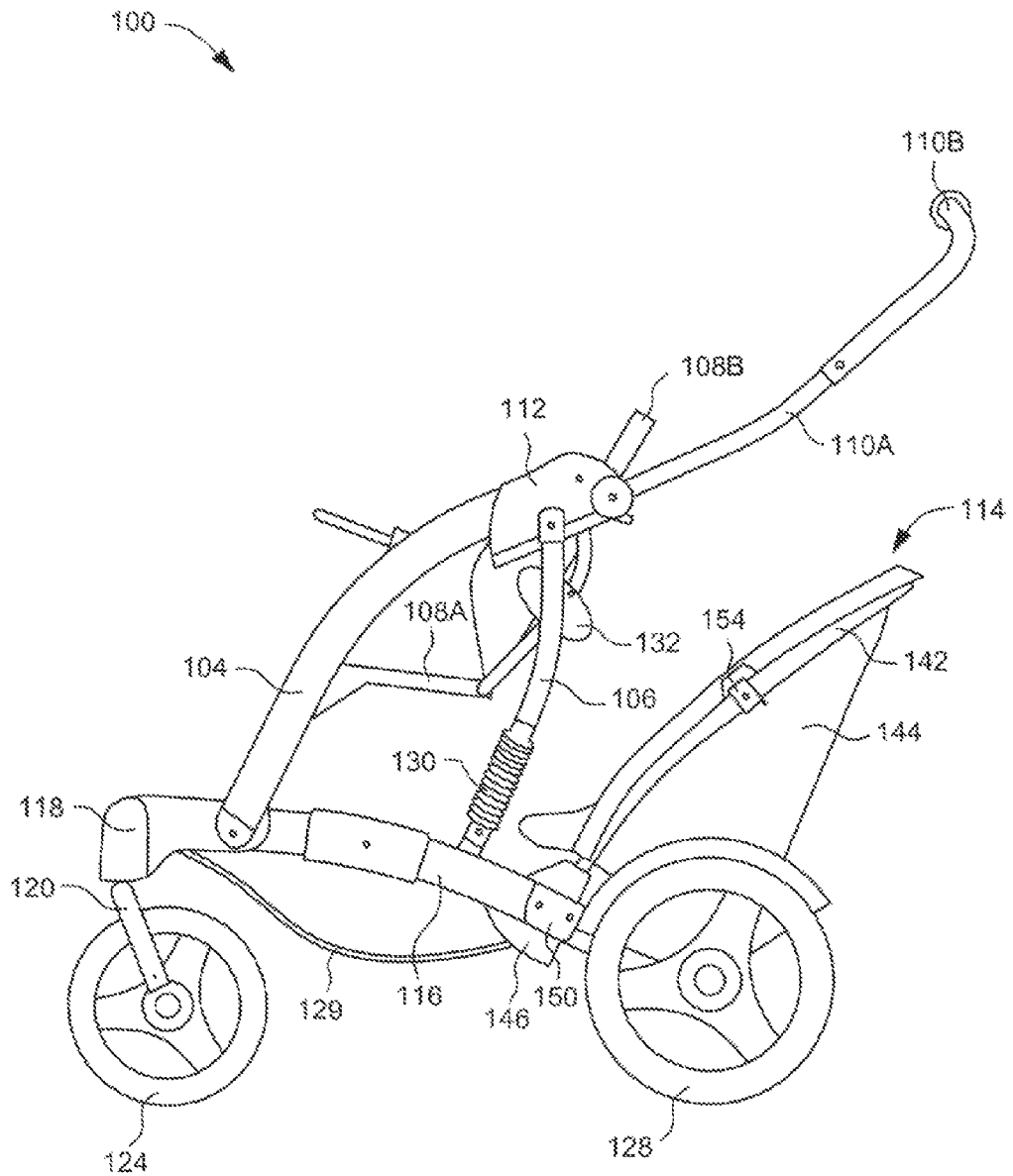
FIG. 2 is a side view of the child carrier apparatus shown in FIG. 1.

FIGS. 1 and 2 are respectively perspective and side views illustrating an embodiment of a child carrier apparatus 100. The child carrier apparatus 100 is exemplary a stroller apparatus. The child carrier apparatus 100 can include a base frame 102, a pair of front support tubes 104, a pair of rear support tubes 106, a first seat 108, a handle 110, a pair of joint structures 112 and a second seat 114.

The base frame 102 can include two tube segments 116. In one embodiment, the two tube segments 116 may be assembled to form a unitary body having a generally V-shape, such that the distance between the front ends of the two tube segments 116 is smaller than the distance between the rear ends of the tube segments 116. The front ends of the two tube segments 116 can be respectively assembled with a bracket 118. An underside of the bracket 118 can be pivotally connected with a front wheel mount 120 that in turn is pivotally assembled with a front wheel 124. The front wheel mount 120 can rotate to change the direction of displacement of the stroller. An upper side of the bracket 118 can be mounted with a footrest board 126 on which a child sitting on the first seat 108 can place the feet. The rear end of each tube segment 116 can be assembled with a rear wheel 128. A storage basket 129 is mounted between two tube segments 116 at a location below the footrest board 126. A partial or entire area of the storage basket 129 can be provided with a plastic board on which a child sitting on the second seat 114 can place the feet.

The front support tubes 104 and rear support tubes 106 can be provided at the left and right sides of the child carrier apparatus 100, and erect upward from the base frame 102. A lower end of each front support tube 104 can be pivotally connected with a front portion of one corresponding tube segment 116. A lower end of each rear support tube 106 can be pivotally connected with a rear portion of one corresponding tube segment 116, and mounted with a shock absorber 130.

The handle 110 can include two side tube segments 110A, and a transverse tube segment 110B connected between the two side tube segments 110A. The transverse tube segment 110B can be grasped by a caregiver to push or pull the stroller apparatus.

On each of the left and right sides, the joint structure 112 can be respectively connected with the upper ends of the front and rear support tubes 104 and 106 and the lower ends of the side tube segments 110A. When the child carrier apparatus 100 is deployed in use, the joint structures 112 can respectively lock the front support tubes 104 and the handle 110 in place. When the child carrier apparatus 100 is collapsed for storage, the joint structures 112 can respectively unlock the front support tubes 104 and the handle 110, such that the front and rear support tubes 104 and 106 and the handle 110 can rotate and fold over one another.

The first seat 108 can be assembled between the front and rear support tubes 104 and 106, and can be used as a front seat of the child carrier apparatus 100. The first seat 108 can include a seat board 108A and a backrest board 108B. A lower end of the backrest board 108B can be connected with a rear portion of the seat board 108A. A front portion of the seat board 108A can be pivotally connected between the front support tubes 104. In order to adjust the inclination of the first seat 108, a seat adjustment mechanism 132 can be respectively mounted at each of the left and right sides of the first seat 108. Each of the seat adjustment mechanisms 132 can have an upper portion and a lower portion respectively assembled with one corresponding joint structure 112 and the rear portion of the seat board 108A.

The second seat 114 can be assembled with the base frame 102 at a position behind the first seat 108, and can be used as a rear seat of the child carrier apparatus 100. In one embodiment, the second seat 114 can be a detachable seat. According to the needs, the second seat 114 can be selectively coupled to the base frame 102, or removed from the base frame 102.

Figure 3:
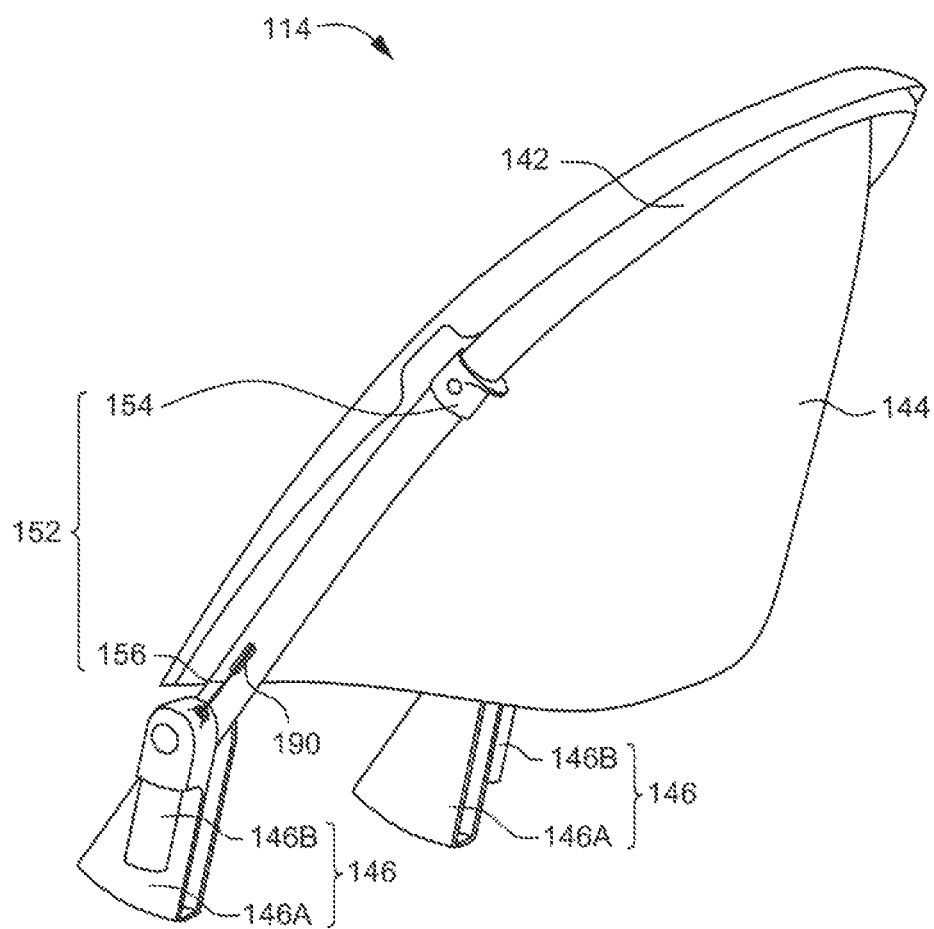
FIG. 3 is a schematic view illustrating a second seat of the child carrier apparatus shown in FIG. 1.

FIG. 3 is a schematic view illustrating the second seat 114. As shown in FIGS. 1-3, the second seat 114 can include a tubular support structure 142, and a seat portion 144 affixed with the support structure 142. The support structure 142 can have a generally U-shape including left and right side segments and a transverse segment. In one embodiment, the two side segments and the transverse segment can be formed in an unitary body. Moreover, each side segment of the support structure 142 can have a distal end respectively mounted with a coupling element 146. The second seat 114 can be detachably fastened with the base frame 102 via engagement of the coupling elements 146 with corresponding structures provided on the base frame 102.

Each of the coupling elements 146 can have a shell body 146A, and a mount portion 146B projecting from a side of the body 146A. The body 146A can have an inner cavity through which one distal end of the support structure 142 is movably assembled. The mount portion 146B can be formed as a tubular portion. The mount portion 146B can be inserted into an attachment fixture 150 affixed with the tube segment 116. Moreover, an interior of the mount portion 146B can be mounted with a latch 174 (better shown in FIGS. 7 and 8) that can come into locking engagement with the attachment fixture 150 to lock the second seat 114 with the base frame 102. In order to switch the latch 174 to an unlocked state, the second seat 114 can be provided with a release mechanism 152 including an actuator element 154 and a cable 156. Exemplary construction of the release mechanism 152 and latch 174 is described hereafter with reference to FIGS. 7-11.

Figure 4:
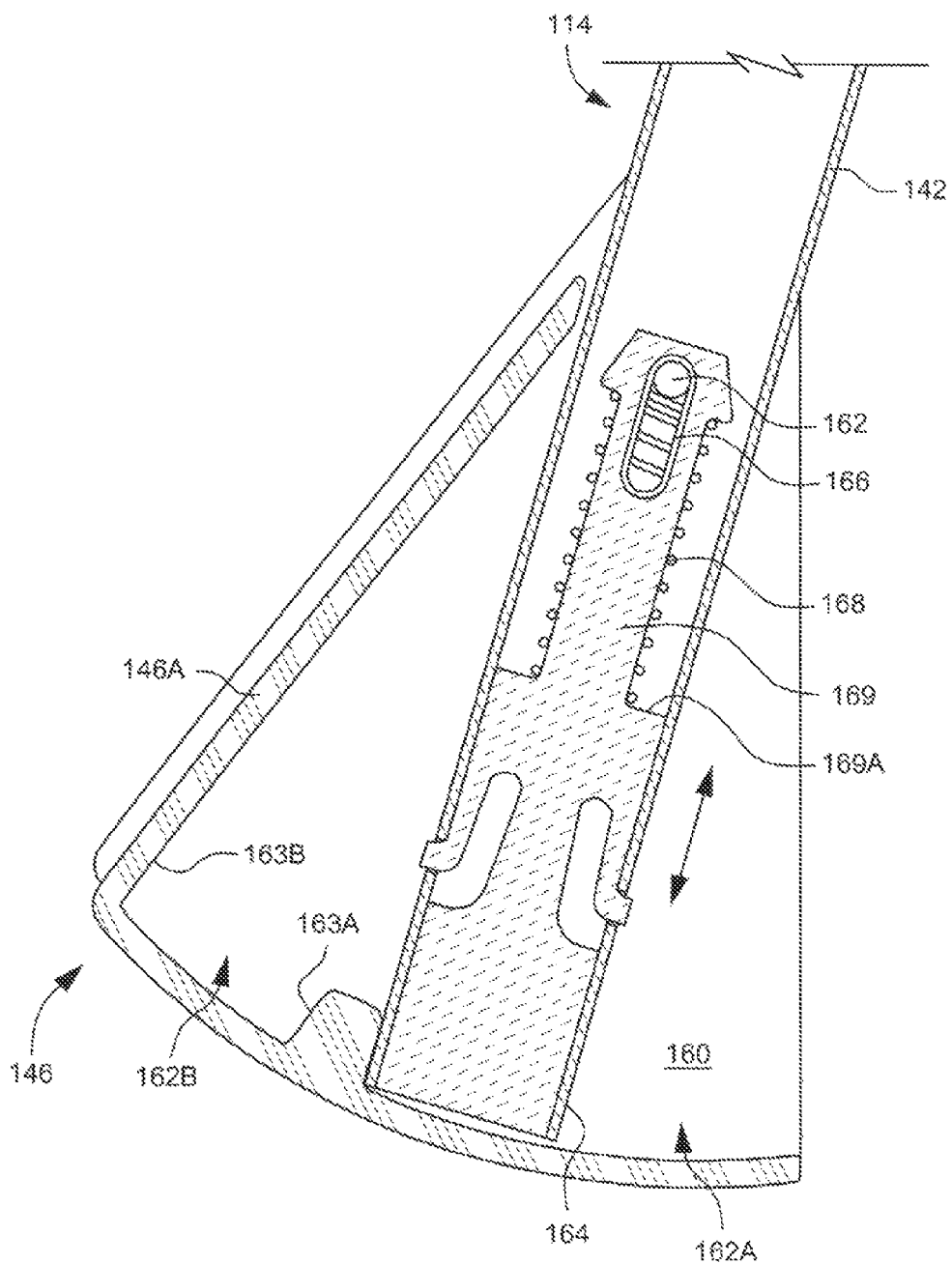
FIG. 4 is a schematic view illustrating the construction of a tubular support structure and a coupling element in the second seat.

FIG. 4 is a schematic view illustrating the construction of the support structure 142 and the coupling element 146. The body 146A of the coupling element 146 can have an inner cavity 160. One distal end of the support structure 142 can be received in the inner cavity 160 of the body 146A, and pivotally connected with the coupling element 146 via a pivot shaft 162. As a result, the support structure 142 can rotate relative to the coupling element 146 to adjust an inclination of the support structure 142 and the second seat 114.

The inner cavity 160 of the body 146A can also include a plurality of locking grooves 162A and 162B that are disposed in different radial directions relative to the pivot shaft 162. One associated distal end of the support structure 142 can be provided with a latch portion 164. Depending on the angular position of the support structure 142 relative to the coupling element 146, the latch portion 164 can engage with one of the locking grooves 162A and 162B. In order to perform locking and unlocking operations, the latch portion 164 can be mounted such that it can displace in radial directions relative to the pivot shaft 162. In one embodiment, the latch portion 164 can be securely affixed with the support structure 142 (e.g., the latch portion 164 can be formed by the distal end of the support structure 142), and the pivot shaft 162 can be mounted through an elongated slot 166 formed through the support structure 142. The support structure 142 and the latch portion 164 can thereby slide in unison relative to the pivot shaft 162. Moreover, an interior of the support structure 142 can be mounted with a spring 168 that can bias the latch portion 164 to engage with any of the locking grooves 162A and 162B. In one embodiment, the spring 168 can be wrapped around an elongated extension 169 provided in the support structure 142, one end of the spring 168 being abutted against the pivot shaft 162, another end of the spring 168 being abutted against a flange 169A of the extension 169.

Figure 5:
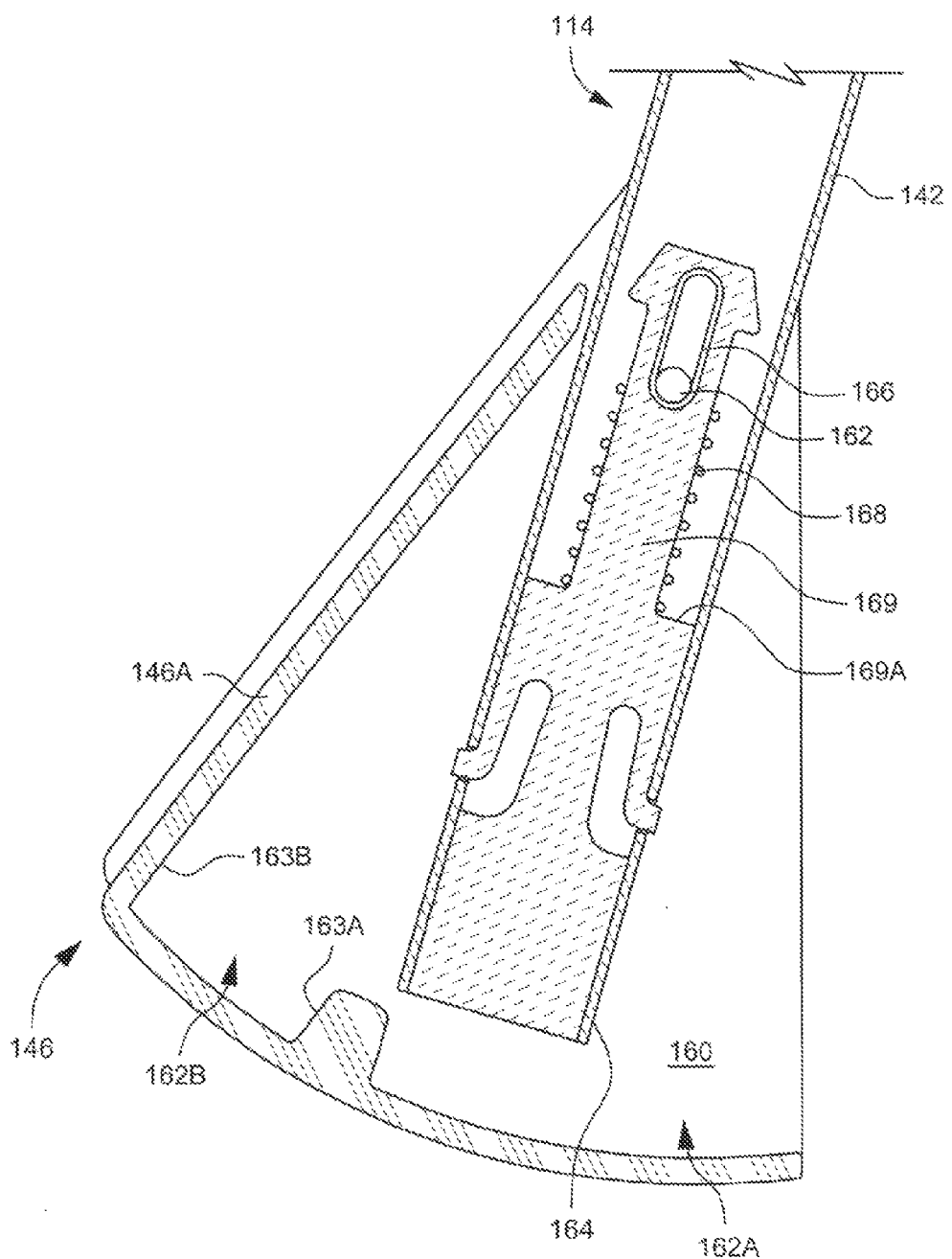
FIGS. 5 and 6 are schematic views illustrating an adjustment of the second seat relative to the coupling element.
Figure 6:
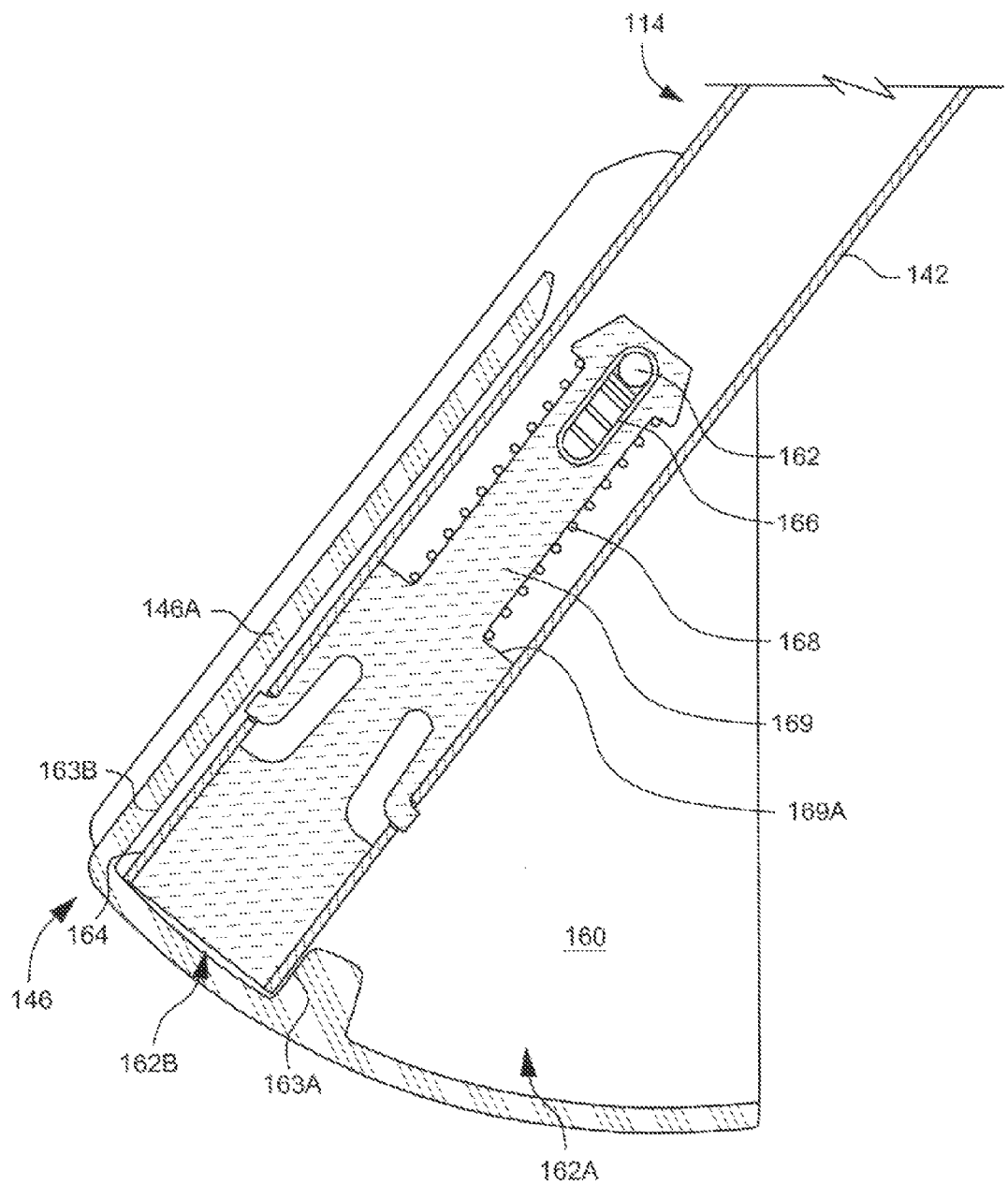

FIGS. 5 and 6 are schematic views illustrating an adjustment of the second seat 114 relative to the coupling element 146. For the sake of clarity, FIGS. 5 and 6 only show the support structure 142 of the second seat 114. When the support structure 142 is pulled up, the latch portion 164 can disengage from one of the locking grooves (e.g., the locking groove 162A) and compress the spring 168. The second seat 114 then can be driven to rotate about the pivot shaft 162 relative to the coupling element 146. When the second seat 114 is adjusted to a desired inclination, the support structure 142 can be released. The spring 168 then can urge the support structure 142 and the latch portion 164 in movement such that the latch portion 164 can engage with another locking groove (e.g., the locking groove 162B). Once the latch portion 164 is engaged with the locking groove 162B, two opposite limiting surfaces 163A and 163B of the locking groove 162B can block rotation of the latch portion 164. The engagement of the latch portion 164 with the locking groove 162B can hold the second seat 114 in a rearward reclined position. The engagement of the latch portion 164 with the locking groove 162A can hold the second seat 114 in a more upright seating configuration.

After the second seat 114 is installed with the base frame 102, the caregiver can easily modify the support structure 142 and seat portion 144 of the second seat 114 relative to the base frame 102 via the aforementioned mechanism. The angular position of the second seat 114 can be thereby adjusted to provide comfortable sitting to the child.

It is worth noting that other constructions may be applicable for locking the second seat in place. For example, the latch portion may also be movably assembled with the support structure 142 so that it can be retracted or extended from a tubular segment of the support structure 142. The support structure 142 can further include a release actuator, and a cable (not shown) connected with the latch portion and the release actuator. By operating the release actuator, the latch portion can be driven in movement relative to the support structure 142 to disengage from any of the locking grooves 162A and 162B. Once the seat is adjusted to the desired angular position, the spring can urge the latch portion to engage with another locking groove to securely hold the seat in place.

Figure 7:
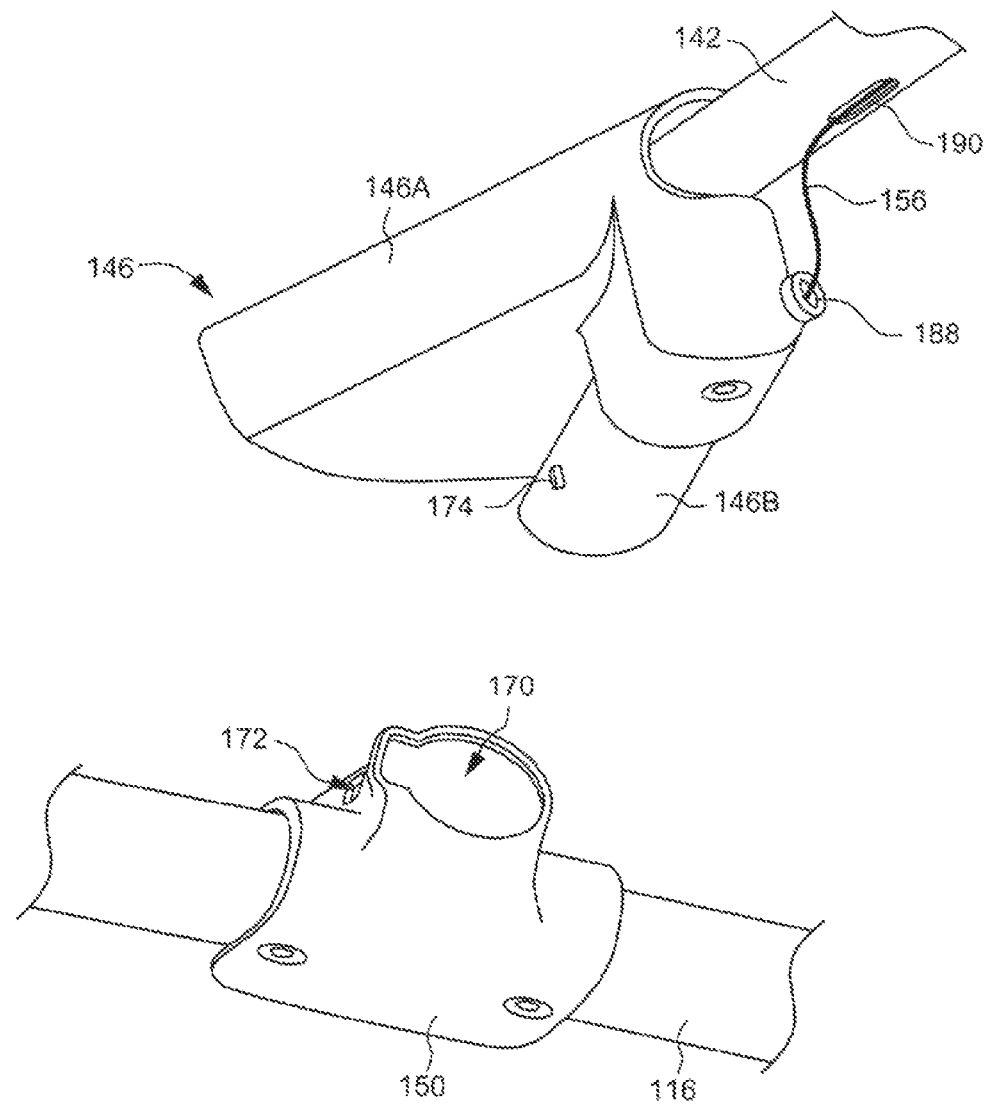
FIGS. 7-10 are schematic views illustrating the assembly of the second seat and the base frame.
Figure 8:
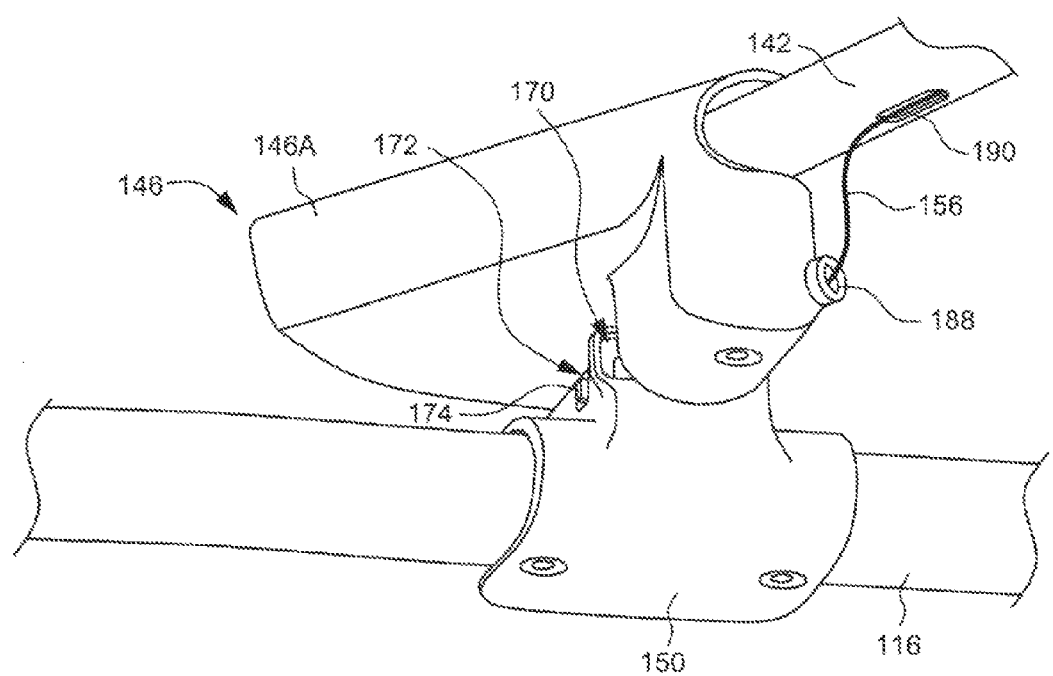

FIGS. 7-10 are schematic views illustrating the assembly of the second seat 114 and the base frame 102. As shown in FIG. 7, the attachment fixture 150 can be affixed with the base frame 102. The attachment fixture 150 can include a slot 170, and an opening 172 adjacent to a sidewall of the slot 170. The coupling element 146 can be assembled with the support structure 142 of the second seat 114, and the mount portion 146B of the coupling element 146 can be inserted through the slot 170 of the attachment fixture 150 to position the second seat 114 on the base frame 102. Once the second seat 114 is positioned on the base frame 102 (as shown in FIG. 8), the latch 174 of the mount portion 146B can be driven by a spring force to engage with the opening 172 to securely fasten the second seat 114 with the base frame 102. The latch 174 can move relative to the coupling element 146 to either protrude outward the mount portion 146B or retract toward the interior of the mount portion 146B, whereby the coupling element 146 and the attachment fixture 150 can be locked together or unlocked from each other.

Figure 9:
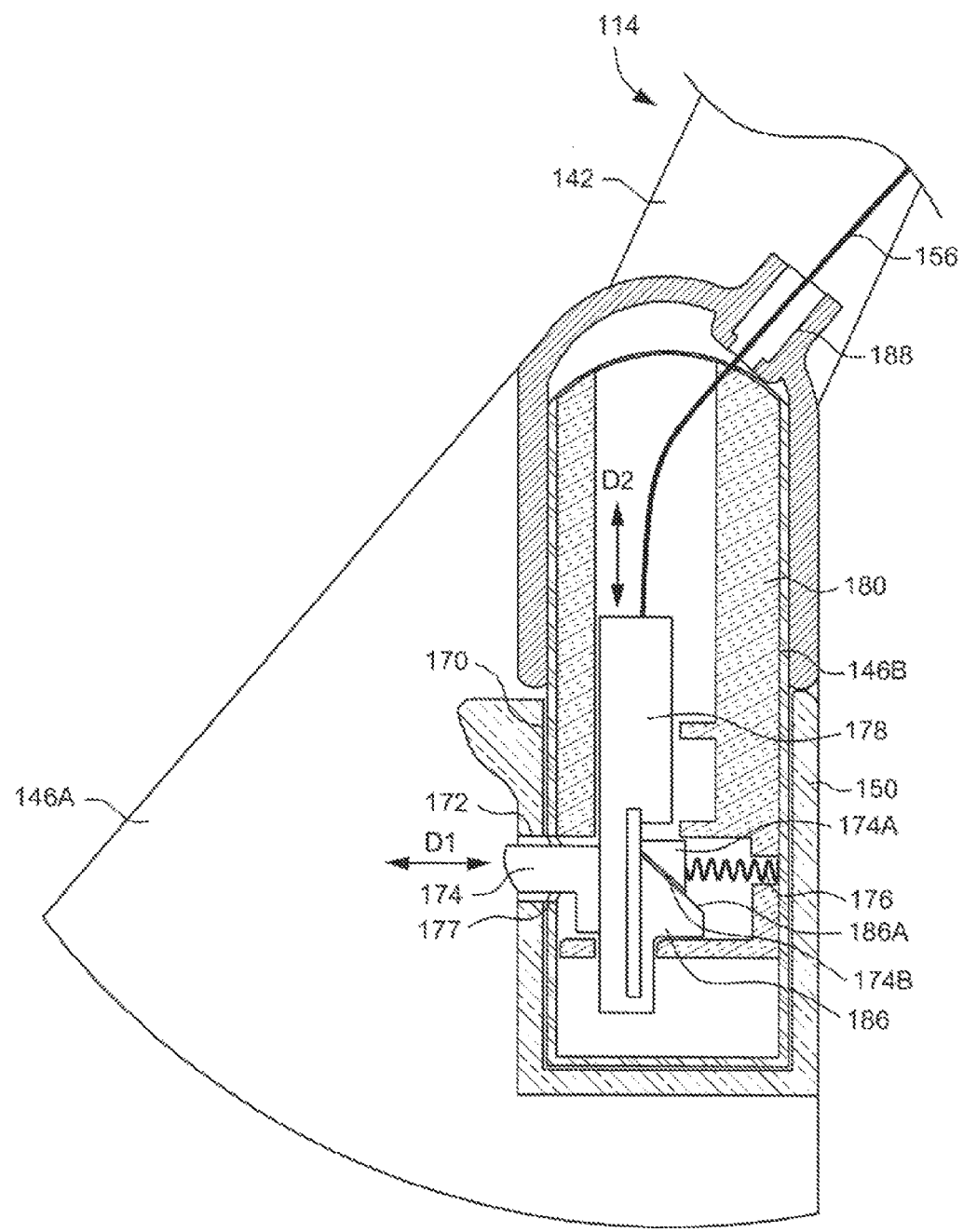

FIG. 9 is a partial cross-sectional view illustrating how the coupling element 146 engages with the attachment fixture 150 and locked therewith via the latch 174. The latch 174 can be mounted in the mount portion 146B of the coupling element 146, and is movable parallel to a first axis D1. The spring 176 can be assembled between the latch 174 and an inner sidewall of the mount portion 146B. When the mount portion 146B is inserted through the slot 170 of the attachment fixture 150, the spring 176 can urge the latch 174 to protrude outward from an opening 177 formed through the mount portion 146B and engage with the opening 172 of the attachment fixture 150. The second seat 114 can be thereby locked in position with the base frame 102.

Figure 10:
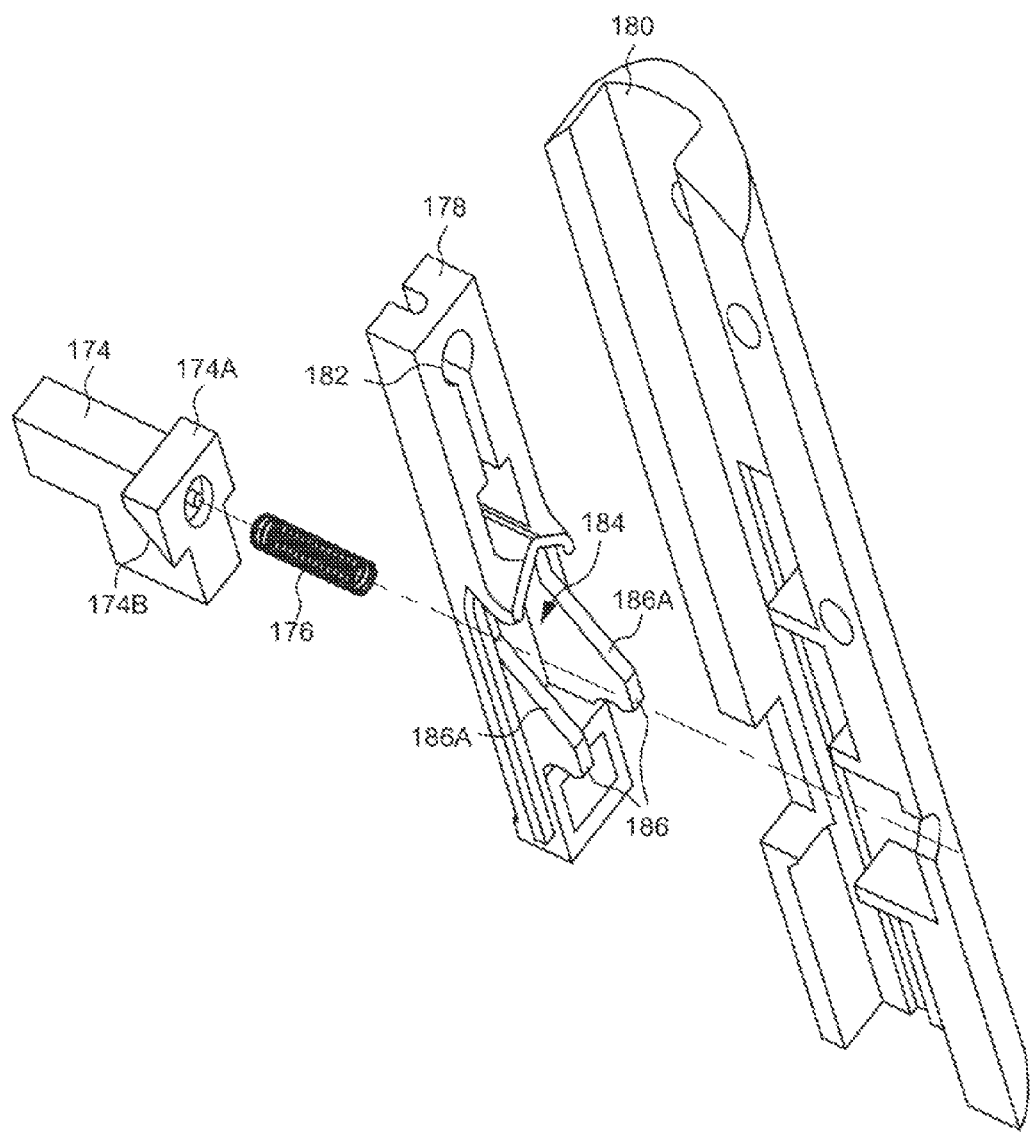

For unlocking the latch 174, a driving element 178 can be assembled in the mount portion 146B of the coupling element 146 at a location adjacent to the latch 174. The driving element 178, the cable 156 and the actuator element 154 (shown in FIG. 3) can form the release mechanism 152. FIGS. 9 and 10 illustrate the assembly of the driving element 178 and the latch 174. The interior of the mount portion 146B can be provided with a guide track 180 along which the driving element 178 is guided in movement parallel to a second axis D2 generally perpendicular to the first axis D1.

As shown in FIG. 10, the driving element 178 can have an elongated shape. An end portion of the driving element 178 can be provided with an opening 182 into which an end of the cable 156 can be securely fitted. The driving element 178 can further include a slot 184 at a position spaced apart from the opening 182. Ribs 186 can be respectively protruding from two sides of the slot 184, each of the ribs 186 having an edge formed with an angled surface 186A.

The latch 174 can be movably mounted through the slot 184 of the driving element 178. A side of the latch 174 adjacent to the spring 176 can be provided with a flange 174A having an angled surface 174B in sliding contact with the angled surface 186A of the rib 186. As the driving element 178 moves parallel to the second axis D2, the sliding contact between the angled surfaces 186A and 174B can guide the latch 174 to move parallel to the first axis D1. With the aforementioned construction, the required space for assembling the latch 174 and the driving element 178 can be reduced.

Referring again to FIGS. 8 and 9, the cable 156 can extend outward from an opening 188 of the coupling element 146, travel into a tubular segment of the support structure 142 through an opening 190 thereof, and extend at least partially along the hollow interior of the support structure 142 to connect with the actuator element 154. The actuator element 154 can be movably assembled on the support structure 142 (as shown in FIG. 3) at a position spaced away from the mount portion 146B. Accordingly, a caregiver can operate the actuator element 154 to unlock the latch 174 via movement transmission through the cable 156 and the driving element 178.

Figure 11:
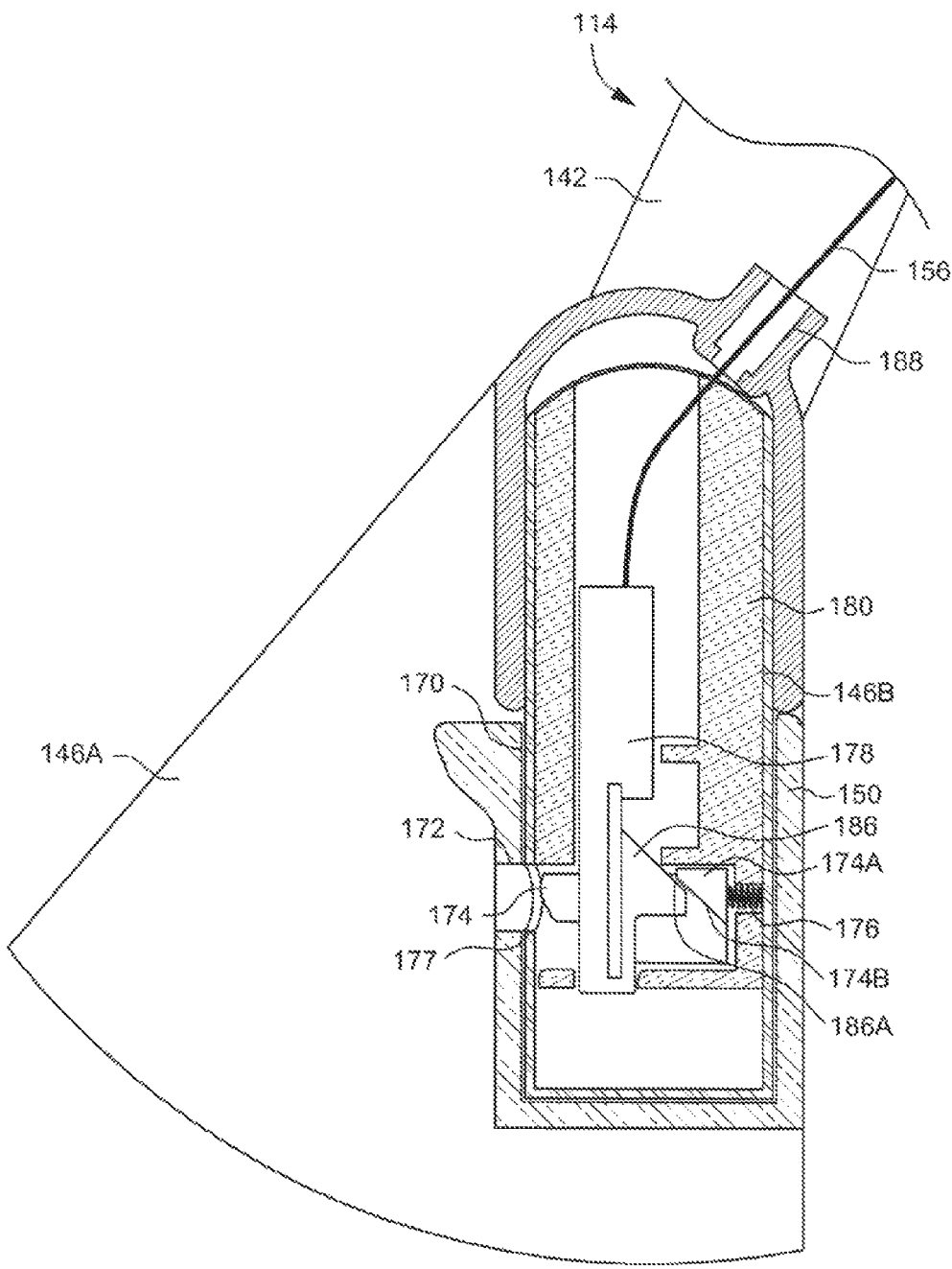
FIG. 11 is a schematic view illustrating the latch in an unlocked state.

FIG. 11 is a schematic view illustrating the latch 174 in an unlocked state. When a pulling action is applied on the actuator element 154 (shown in FIG. 3), the cable 156 can pull the driving element 178 to move upward parallel to the second axis D2. Owing to the sliding contact between the angled surfaces 186A and 174A, the latch 174 can be pushed to move parallel to the first axis D1 toward the interior of the mount portion 146B. As a result, the latch 174 can shift from the locking position shown in FIG. 9 to the unlocking position shown in FIG. 11 which is disengaged from the opening 172. Then the caregiver can remove the mount portion 146B of the coupling element 146 from the attachment fixture 150 to detach the second seat 114.

When the second seat 114 is to be installed on the base frame 102, the mount portion 146B of the coupling element 146 can be inserted through the slot 170 of the attachment fixture 150. The spring 176 then can urge the latch 174 to engage with the opening 172 of the attachment fixture 150, whereby the second seat 114 can be locked with the base frame 102.

It is worth noting that the latch element 174 and the release mechanism 152 do not have to be necessarily used in association with the adjustable coupling element 146. In alternate embodiments where the second seat 114 does not need adjustment functionality, the same latch 174 and release mechanism 152 may also be directly assembled with each end portion of the support structure 142 (e.g., the latch 174 can be mounted through each distal end of the support structure 142). The support structure 142 in turn can be directly inserted through the attachment fixture 150 such that the latch 174 can directly lock with the attachment fixture 150. Likewise, the release mechanism 152 can be operated to unlock the latch element 174.

Figure 12:
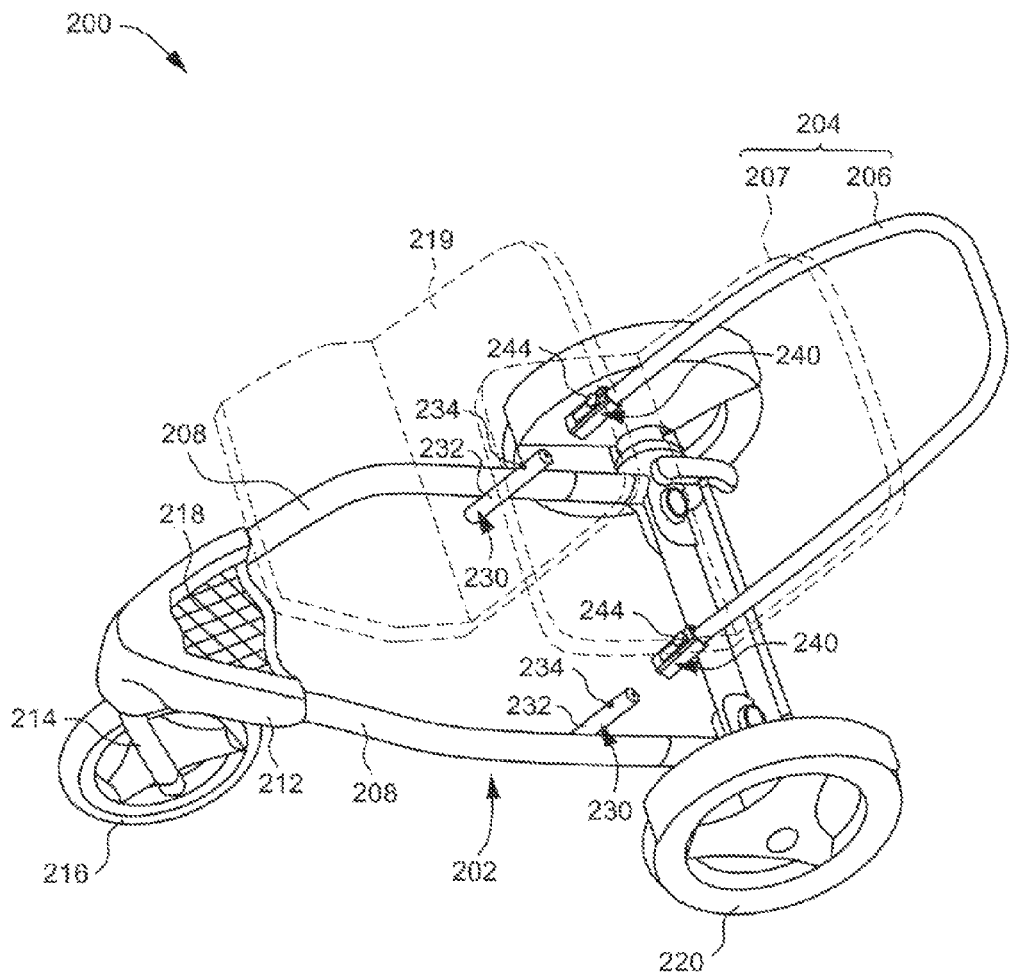
FIG. 12 is a perspective view illustrating another embodiment of a child carrier apparatus.

FIG. 12 is a perspective view illustrating another embodiment of a child carrier apparatus 200. The child carrier apparatus 200 can include a base frame 202, and a seat 204 detachably assembled on the base frame 202. In one embodiment, the seat 204 can include a tubular support structure 206 having a generally U-shape, and a seat portion 207 (shown with dashed lines).

The base frame 202 can be similar to the previous embodiment in construction, including two tube segments 208 assembled to form a unitary body having a generally V-shape. The front ends of the two tube segments 208 can be respectively assembled with a bracket 212. An underside of the bracket 212 can be pivotally connected with a front wheel mount 214 that in turn is pivotally assembled with a front wheel 216. The front wheel mount 214 can rotate to change the direction of displacement of the stroller. An upper side of the bracket 212 can be mounted with a footrest board 218 having a generally triangular shape on which a child sitting on another seat 219 (shown with dashed lines) can place the feet. The seat 219 can be disposed in front of the seat 204, such that the seats 219 and 204 can be respectively used as front and rear seats of the child carrier apparatus 200. A rear portion of each tube segment 208 can be respectively assembled with a rear wheel 220.

The base frame 202 can include two attachment fixtures 230. In one embodiment, the two attachment fixtures 230 can be respectively affixed with the rear portions of the two tube segments 208. Each of the attachment fixtures 230 can include a tubular segment 232 and a latch 234. The support structure 206 can have side distal ends that can respectively receive the insertion of the tubular segments 232 and lock therewith via the latch 234 to removably attach the seat 204 with the base frame 202.

Figure 13:
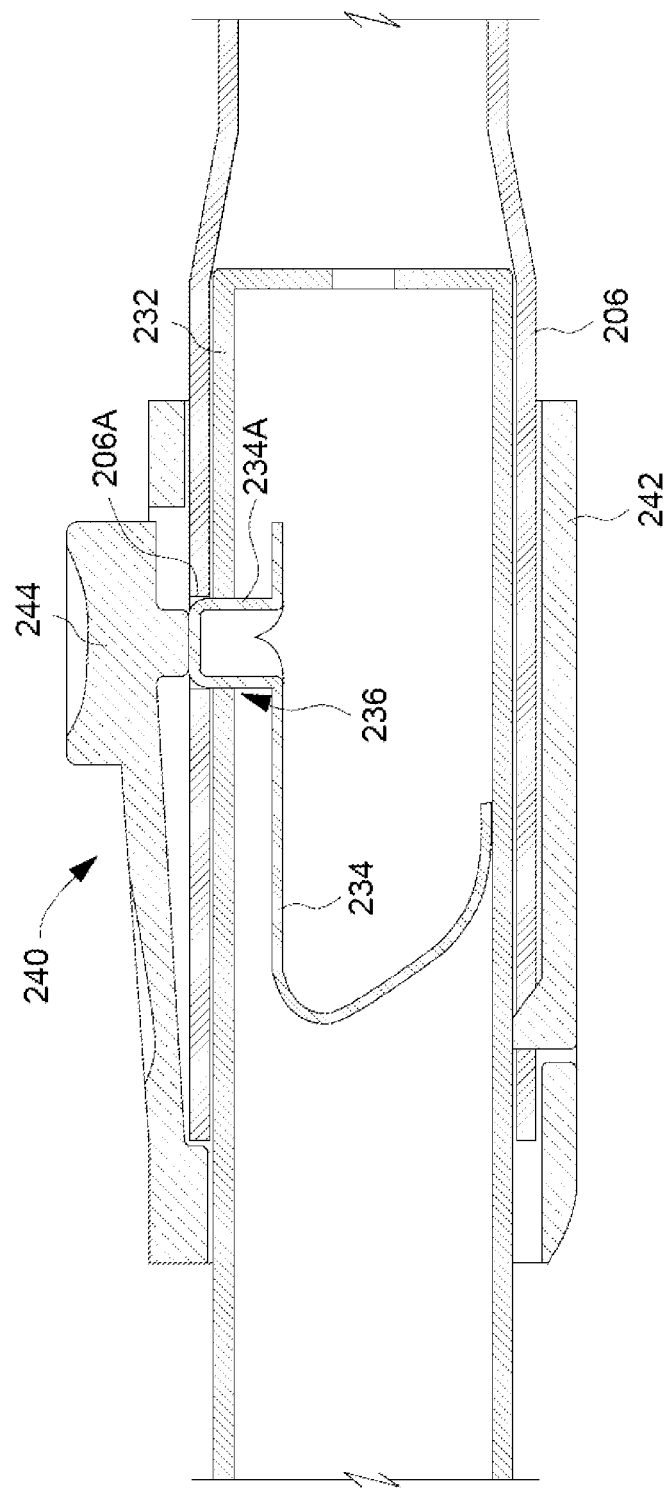
FIG. 13 is a cross-sectional view illustrating how a tubular support structure of a seat locks with an attachment fixture in the child carrier apparatus shown in FIG. 12.

FIG. 13 is a cross-sectional view illustrating how the support structure 206 of the seat 204 locks with the attachment fixture 230. The latch 234 can be provided in the tubular segment 232 of the attachment fixture 230. In one embodiment, the latch 234 can be formed as a bent or U-shaped resilient part having a side portion provided with a stud 234A that can protrude outward from an opening 236 of the tubular segment 232. After the tubular segments 232 are inserted through the side distal ends of the support structure 206, the elasticity of the latch 234 can cause the studs 234A to respectively engage with corresponding openings 206A provided on the support structure 206, whereby the seat 204 is attached with and cannot be detached from the base frame 202.

Moreover, the left and right side distal ends of the support structure 206 can be respectively provided with release mechanisms 240. Each of the release mechanisms 240 can be actuated to unlock the corresponding latch 234. As shown in FIG. 13, the release mechanism 240 can include a sleeve 242, and a resilient actuator element 244 extending from the sleeve 242 and located at a position corresponding to the opening 206A. In one embodiment, the actuator element 244 can be integrated with the sleeve 242.

Figure 14:
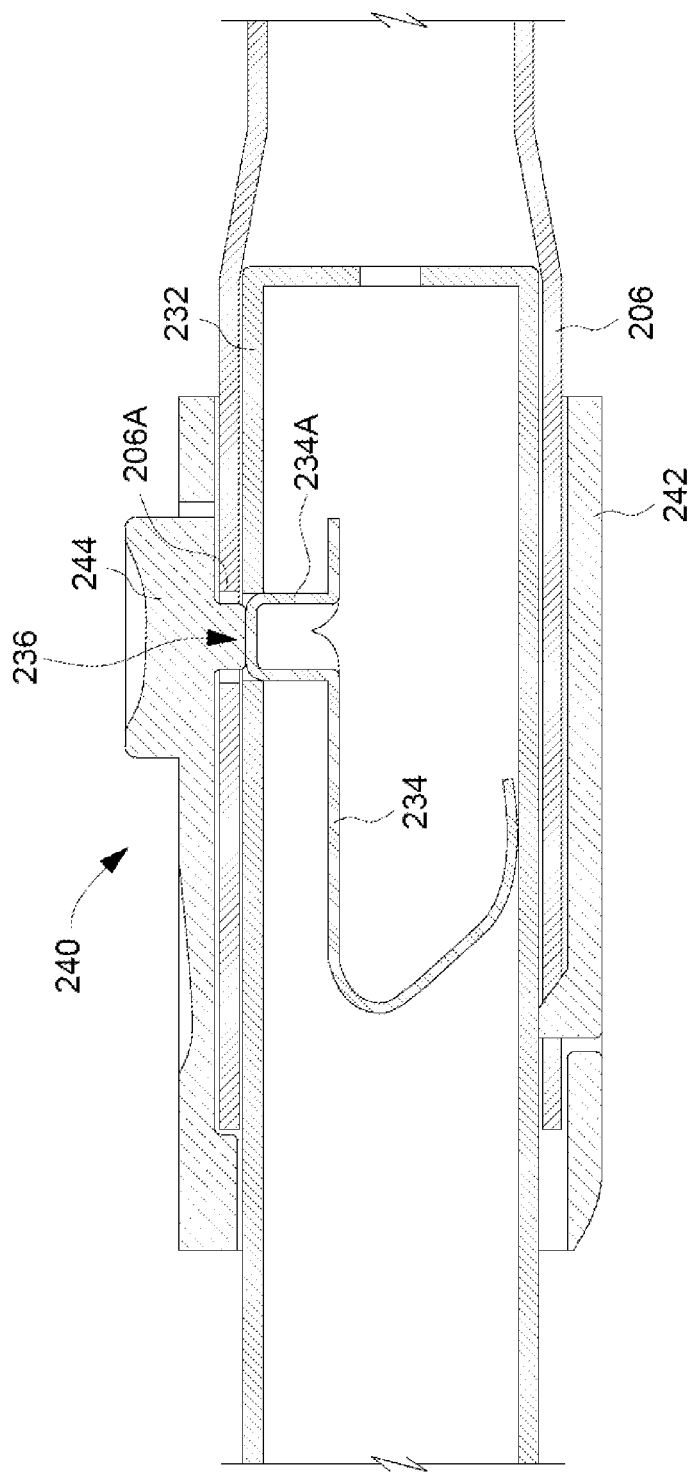
FIG. 14 is a schematic view illustrating the operation of a release mechanism in the child carrier apparatus shown in FIG. 12.

FIG. 14 is a schematic view illustrating the operation of the release mechanism 240. When the seat 204 is attached with the base frame 202, the stud 234A of each latch 234 can respectively engage with the opening 206A of the support structure 206. Moreover, the actuator element 244 can be positioned in substantial alignment with the position of the stud 234A. In case the caregiver wants to remove the seat 204 from the base frame 202, the actuator element 244 can be pressed toward the stud 234A. As a result, the actuator element 244 can push the latch element 234 to move from the locking position shown in FIG. 13 to the unlocking position shown in FIG. 14 in which the stud 234A disengages from the opening 206A of the support structure 206. The seat 204 then can be removed from the base frame 202.

It is worth noting that while the latch 234 and the release mechanism 240 have been described as being respectively provided in the attachment fixture 230 and the support structure 206, the positions where these parts are installed may also be interchanged in alternate embodiments. For example, rather than inserting the tubular segment 232 into the support structure 206, the tubular segment 232 may be sized to receive the insertion of the distal end of the support structure 206. In this case, the latch 234 may be installed in the tube segment of the support structure 206, whereas the release mechanism 240 may be provided on the tubular segment 232 of the attachment fixture 230. Locking and unlocking operations for this variant embodiment will be similar.

With the child carrier apparatus described herein, the caregiver can easily remove and install the rear seat. After it is installed with the support frame of the child carrier apparatus, the rear seat can also be adjusted to modify its inclination. While the detachable seat structures described herein are exemplary applied to rear seats, alternate embodiments may also have front seats having similar constructions and functions. Moreover, the embodiments described herein show rear and front seats that are placed in a same orientation, i.e., the front and rear seats can receive the placement of a child facing forward. However, alternate embodiments may also provided front and rear seats that are placed in opposite orientations, i.e., one seat (e.g., the front seat) is facing forward while the other seat (e.g., the rear seat) is facing rearward.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child carrier apparatus comprising:
   a base frame having a tube segment that is affixed with an attachment fixture; and
   a detachable seat including a tubular support structure, and a coupling element mounted at a side segment of the support structure, the support structure and the coupling element being pivotally connected each other via a pivot shaft, the coupling element including a plurality of holding grooves disposed in different radial directions relative to the pivot shaft, and the support structure being operable to lock with any of the holding grooves to hold the seat at different angular positions;
   wherein an inclination of the support structure is adjustable relative to the coupling element, and the coupling element is configured to detachably lock with the attachment fixture via a latch for holding the seat with the base frame.

2. The child carrier apparatus according to claim 1, wherein the coupling element includes a mount portion of a tubular shape, and when the coupling element is locked with the attachment fixture, the mount portion inserts into the attachment fixture and the latch respectively engages through corresponding openings formed through the mount portion and the attachment fixture.

3. The child carrier apparatus according to claim 2, wherein the latch is assembled in the mount portion, and is movable between a locking position and an unlocking position.

4. The child carrier apparatus according to claim 3, wherein the latch is biased toward the locking position by a spring force.

5. The child carrier apparatus according to claim 2, wherein the seat includes a release mechanism operable to unlock the latch.

6. The child carrier apparatus according to claim 5, wherein the release mechanism includes:
   a driving element assembled in the mount portion at a position adjacent to the latch;
   an actuator element movably assembled with the support structure at a position spaced apart from the mount portion; and
   a cable extending at least partially along the support structure and having two ends respectively connected with the driving element and the actuator element;

wherein the actuator element is operable to drive the latch to the unlocking position via the connection of the cable and the driving element.

7. The child carrier apparatus according to claim 6, wherein the latch is movable parallel to a first axis, and the driving element is movable parallel to a second axis generally perpendicular to the first axis.

8. The child carrier apparatus according to claim 7, wherein the driving element includes a slot through which the latch is movably assembled.

9. The child carrier apparatus according to claim 1, wherein the support structure includes a latch portion that is movable in a radial direction relative to the pivot shaft to engage with or disengage from any of the holding grooves.

10. The child carrier apparatus according to claim 9, wherein the latch portion is formed by a distal end of the support structure, and the pivot shaft is mounted through an elongated slot of the support structure such that the support structure is operable to slide relative to the pivot shaft.

11. The child carrier apparatus according to claim 1, wherein the seat is a rear seat, and the child carrier apparatus further comprises a front seat disposed in front of the rear seat.

12. A child carrier apparatus comprising:
a base frame affixed with an attachment fixture; and
a seat operable to attach with and detach from the base frame, wherein the seat includes:
a tubular support structure;
a coupling element mounted with a side segment of the support structure and including a mount portion, wherein an inclination of the support structure is adjustable relative to the coupling element, and the mount portion is coupled with the attachment fixture for installing the seat on the base frame;
a latch assembled through an interior of the mount portion and operable to lock the coupling element with the attachment fixture; and
a release mechanism operable to unlock the latch, the release mechanism including:
a driving element assembled in the mount portion at a position adjacent to the latch;
an actuator element movably assembled with the support structure at a position spaced apart from the mount portion, the actuator element being operable to drive the latch to an unlocking position; and
a cable extending at least partially along the support structure and having two ends respectively connected with the driving element and the actuator element.

13. The child carrier apparatus according to claim 12, wherein the mount portion has an interior provided with a guide track along which the driving element is guided for movement.

14. The child carrier apparatus according to claim 12, wherein the latch is movable parallel to a first axis, and the driving element is movable parallel to a second axis generally perpendicular to the first axis.

15. The child carrier apparatus according to claim 12, wherein the driving element includes a slot through which the latch is movably assembled.

16. The child carrier apparatus according to claim 15, wherein the driving element includes a rib protruding at a side of the slot and having a first angled surface, and the latch has a flange provided with a second angled surface in sliding contact with the first angled surface.

17. The child carrier apparatus according to claim 12, wherein when the coupling element is locked with the attachment fixture, the latch respectively passes through corresponding openings formed through the mount portion and the attachment fixture.

18. The child carrier apparatus according to claim 12, further including a spring assembled between the latch and an inner sidewall of the mount portion, the spring being operable to bias the latch toward a locking position to lock the coupling element with the attachment fixture.

19. The child carrier apparatus according to claim 12, wherein the support structure has a generally U-shape.

* * * * *